United States Patent

Gill

[11] 4,185,945
[45] Jan. 29, 1980

[54] CYLINDER MOUNTING

[75] Inventor: Stephen H. Gill, Mentor, Ohio

[73] Assignee: Caterpillar Tractor Co., Peoria, Ill.

[21] Appl. No.: 813,730

[22] Filed: Jul. 7, 1977

[51] Int. Cl.² ............................................. E02F 3/38
[52] U.S. Cl. .................................... 414/727; 52/115;
 92/118; 212/144; 403/131; 414/694
[58] Field of Search ............... 214/138 R, 145 R, 769,
 214/770; 212/144; 52/115, 116, 117; 403/76,
 79, 122, 131, 158; 92/118; 414/694, 722, 727,
 706, 707

[56] References Cited
U.S. PATENT DOCUMENTS

| | | | |
|---|---|---|---|
| 2,918,039 | 12/1959 | Boje et al. | 92/118 |
| 3,168,014 | 2/1965 | Aslan | 92/118 |
| 3,327,880 | 6/1967 | Brown | 214/770 |
| 3,537,735 | 11/1970 | Hawk | 403/76 X |

Primary Examiner—L. J. Paperner

Attorney, Agent, or Firm—Phillips, Moore, Weissenberger, Lempio & Majestic

[57] ABSTRACT

A shovel linkage for a hydraulic excavator includes boom rails having pivot means in one end for pivotal connection to an excavator and cross tubes extending between the rails near the pivot means and having pivot joints provided thereon for connection of actuating cylinders for the linkage in line with the cross tube and close to the pivot means whereby forces imparted to the linkage by the actuating cylinders will be directly through the center of the cross tube and very near the boom rail pivot means, minimizing bending moments in the linkage.

The pivot joint includes a flat tab member provided on the cross tube and projecting outwardly along a diameter thereof, and a pin and ball connecting the bifurcated end of a hydraulic cylinder to the tab for limited rotation thereof. The pin is disposed substantially normal to the plane of the boom rails for unimpeded insertion and removal thereof.

2 Claims, 6 Drawing Figures

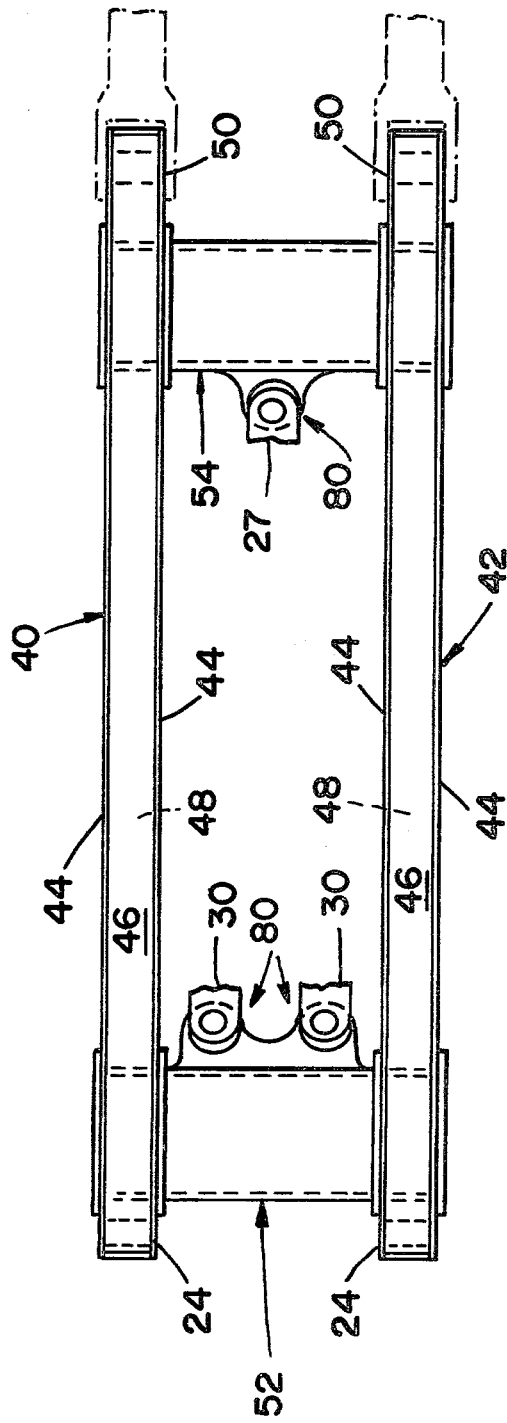
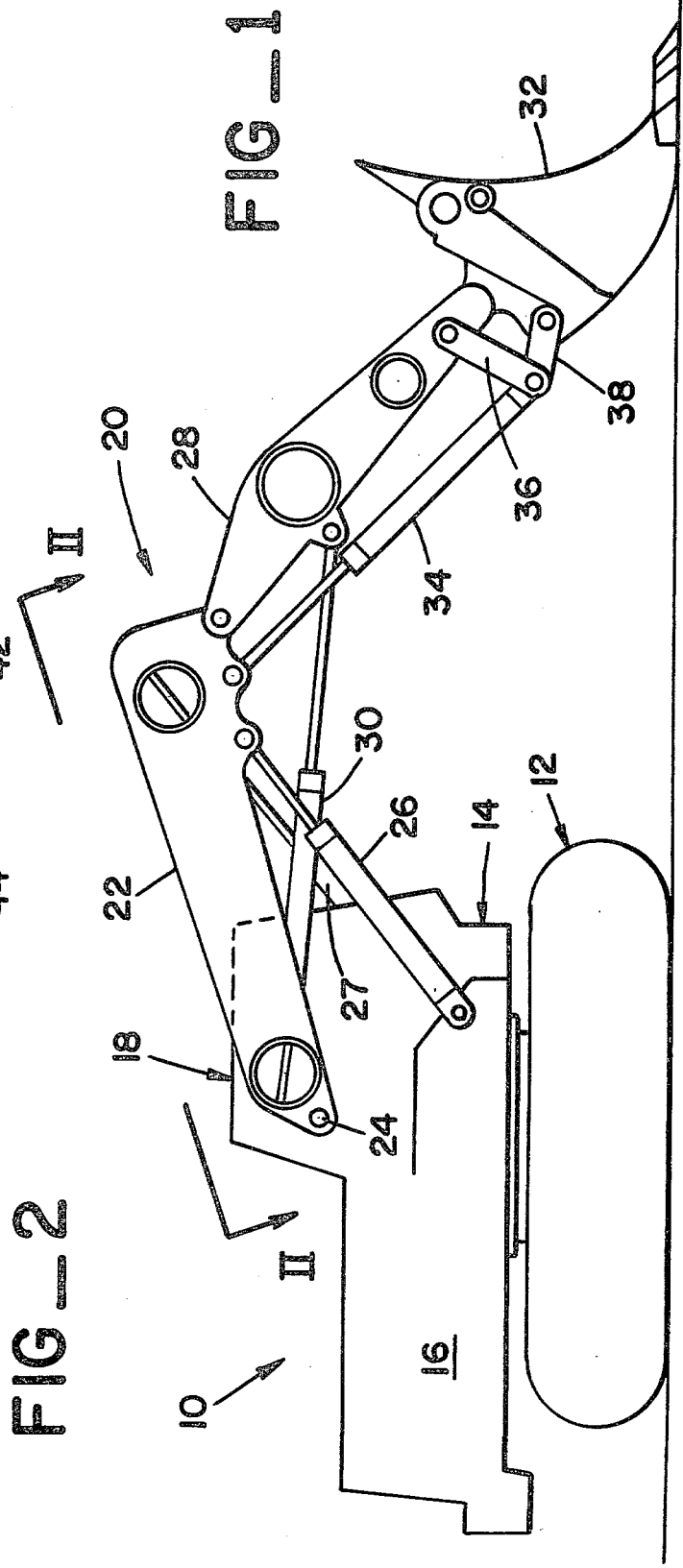

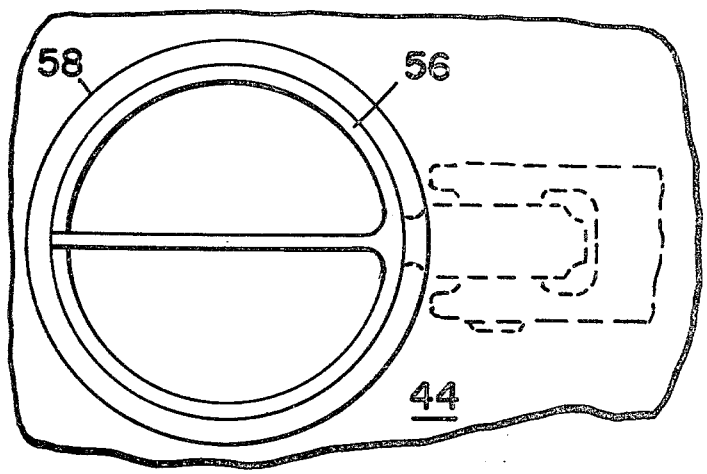
FIG_4
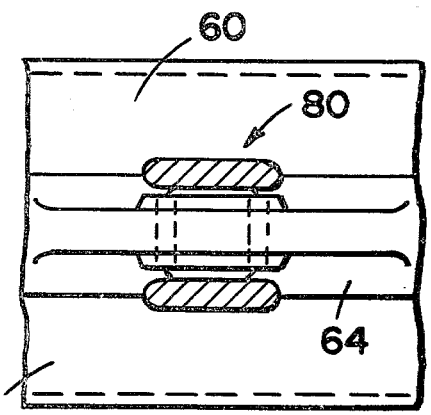
FIG_5
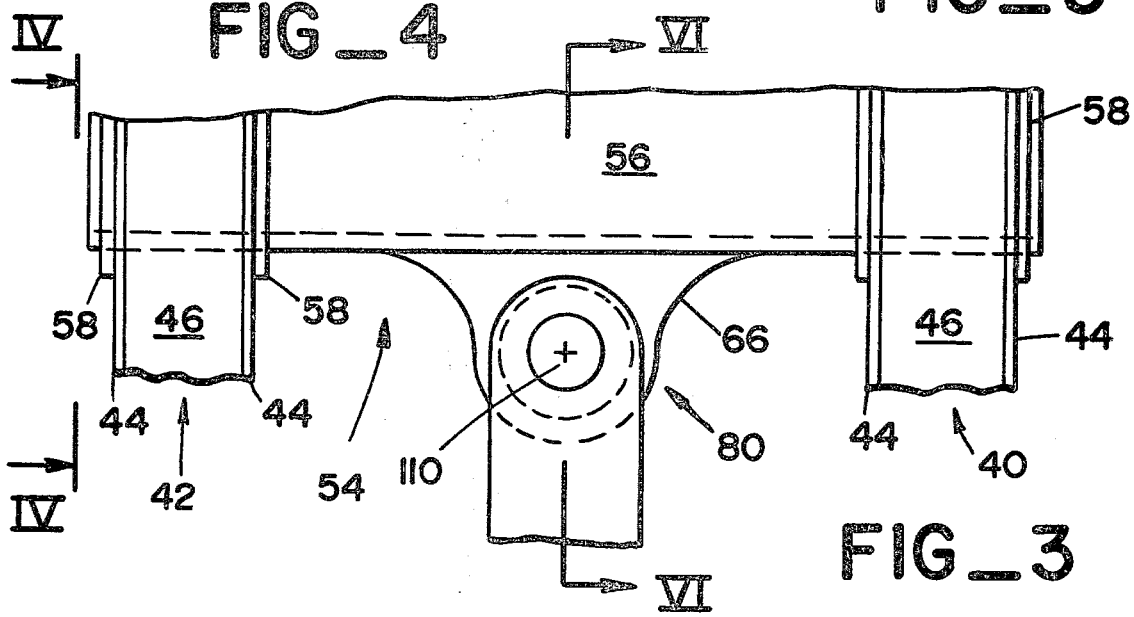
FIG_3
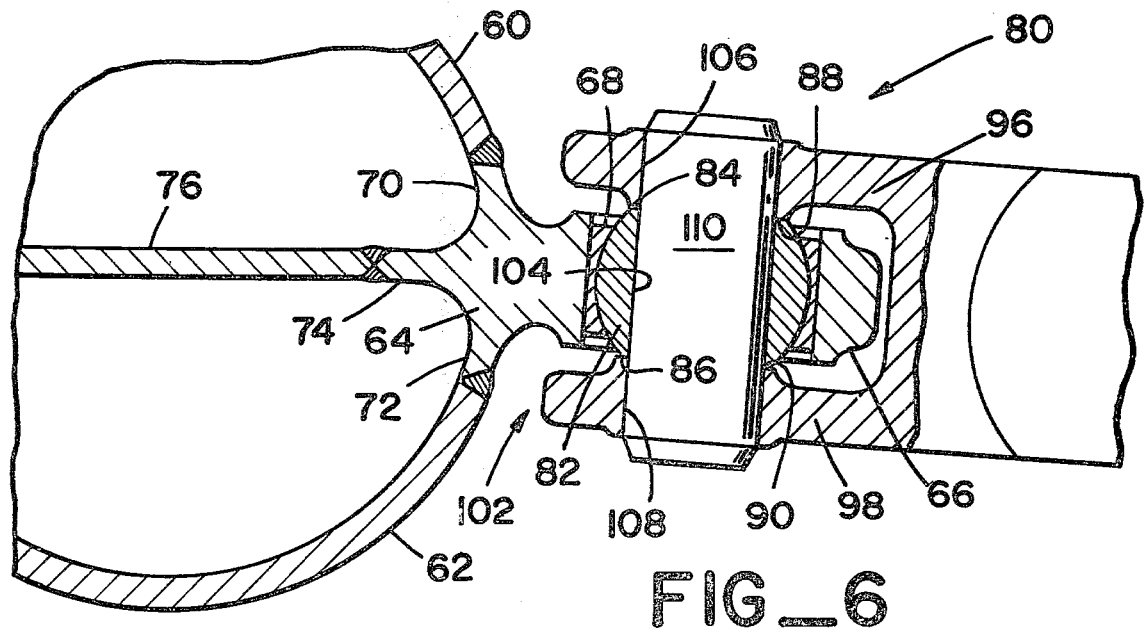
FIG_6

CYLINDER MOUNTING

BACKGROUND OF THE INVENTION

This invention relates to the field of shovel linkages for hydraulic excavators and the like, and more particularly to the means for mounting the actuating cylinders thereof to the linkage. Typically such linkages comprise a link, generally known as a boom, pivotally mounted on the frame of the excavator, and a second link, known as a stick, pivotally mounted on the distal end of the boom, and having an implement, such as a bucket, pivotally mounted on the distal end thereof. The bucket is manipulated both vertically and horizontally in the plane defined by the boom and stick by pivotal movement of the boom with respect to the frame, the stick with respect to the boom, and the bucket with respect to the stick. Such actuation is effected and controlled by means of hydraulic actuating cylinders pivotally interconnecting the bucket and the stick, the stick and the boom, and the boom and the frame of the excavator. Such cylinders are typically connected to suitable brackets affixed to and projecting from these members. During the work cycle of a large shovel, it is necessary for the hydraulic actuating cylinders to apply large loads to the linkage members through the brackets or other attachment means by which they are connected to such members. Due to the manner in which the cylinders are secured to the shovel linkage members in prior art designs, moment arms exist which cause the cylinders to induce large torsional loads in the linkage members, which may lead to early fatigue of portions thereof.

SUMMARY OF THE INVENTION

Accordingly it is an object of the present invention to provide a shovel linkage for a hydraulic excavator whereby the actuating cylinders thereof will impart loads to the members of the linkage in such a manner that torsional loads and bending moments are minimized.

A further object of the present invention is to provide a shovel linkage with a cylinder mounting which provides for limited rotation of the cylinder during operation of the linkage.

It is another object of the invention to provide a cylinder mounting which may be easily connected and disconnected.

These and other objects and advantages are achieved by the present invention which comprises a shovel linkage having a boom and stick both comprising parallel rails joined by cross tubes having pivot joints provided thereon for pivotal connection of hydraulic cylinders thereto, for operation of the associated links.

The cross tube mounting the stick actuating cylinder is provided on the boom near the pivotal attachment of the boom to the excavator for reduced bending moments.

The pivot joint on the cross tube is provided in flat tab members which project outwardly from the cross tube in the plane of a diameter of the cross tube so that the forces imparted to the cross tube by the cylinder upon actuation thereof are directed along a diameter of the cross tube.

The pivot joint comprises a bore provided in the cross tube tab member, a ball provided in the tab bore and having a pin bore therein, an actuating cylinder having a bifurcated end which embraces the tab and has a pin bore provided therein, and a pin disposed in the ball and cylinder pin bores.

The pivot joint is constructed so that the pin is disposed along a line which projects between the rails for ease of insertion and removal without interference by the rails.

DESCRIPTION OF THE DRAWINGS

In the drawings:

FIG. 1 is an elevational view of a hydraulic excavator equipped with a shovel linkage embodying the cylinder mounting of the present invention;

FIG. 2 is a plan view of the boom link of FIG. 1 taken along the line and in the direction indicated by the arrows II—II;

FIG. 3 is an enlarged view of a portion of the cross tube shown in FIG. 2;

FIG. 4 is an end view of the cross tube and rail shown in FIG. 3 taken along the line and in the direction indicated by the arrows IV—IV;

FIG. 5 is an end view of a portion of the cross tube shown in FIG. 4 as seen from the right, and FIG. 6 is a sectional view of the cross tube cylinder mounting of the present invention.

DESCRIPTION OF THE PREFERRED EMBODIMENT

Referring to FIG. 1, a hydraulic excavator embodying the present invention is shown generally at 10 as comprising an undercarriage 12, and a frame 14 pivotally mounted thereon, which includes an engine compartment 16 and an operator's cab 18. Mounted on frame 14 and extending forwardly thereof is a shovel linkage indicated generally by the reference numeral 20. The shovel linkage includes a boom 22 pivotally mounted on frame 14 by means of pivots 24 and actuable with respect to the frame by means of a pair of hydraulic cylinders 26 pivotally mounted to the excavator frame 14 and to the forward end of the boom 22, and a hydraulic cylinder 27 pivotally connected to the frame and to the boom.

Pivotally mounted to the forward end of the boom is a stick 28 which is actuable with respect to the boom by means of a pair of hydraulic cylinders 30 pivotally connected to the boom and to the stick as will be described hereinafter.

Pivotally connected to the distal end of the stick is a bucket 32 which is actuable with respect to the stick by means of hydraulic cylinders 34 which are pivotally connected to the forward end of the boom and to links 36 and 38 which are pivotally connected to the stick and bucket respectively.

Referring to FIG. 2, boom 22 comprises spaced parallel rails 40 and 42 which are of a generally boxlike configuration and include side walls 44 joined by top and bottom walls 46 and 48. Pivots 24 are provided in one end of rails 40 and 42 for pivotal connection of the boom to the excavator frame 14 as previously described. Additional pivots 50 are provided in the other ends of the rails for pivotal connection of the stick thereto.

Rails 40 and 42 are interconnected by means of cross tubes 52 and 54. Referring to FIG. 3, the cross tubes comprise cylindrical members 56 which extend through appropriate openings in the side walls 44 of rails 40 and 42 and are retained therein by means of flanges 58 secured to the cylindrical members immediately adjacent to the side walls of the rails.

As shown in FIG. 6, cylindrical members 56 comprise arcuate members 60 and 62 and a bracket member 64 which includes a tab 66 having a pivot bore 68 provided therein for a pivotal attachment of a hydraulic cylinder thereto. Bracket member 64 also includes arcuate portions 70 and 72 which abut members 60 and 62, and a diametral portion 74 which extends inwardly of the cylindrical member and abuts a diametral backing member 76 which extends across a diameter of the cylindrical member and is abutted at the opposite side of the cylindrical member from bracket member 64 by the other edges of arcuate members 60 and 62. During assembly of the cross tube, the members are welded together at the junctures shown to provide a unitary member.

It will be noted that diametral portion 74 of bracket member 64 and diametral backing member 76 define a diameter of cylindrical member 56 which extends through the center of bracket member 64 coplanar with tab portion 66 and normal to pivot bore 68 provided in bracket member 64. It will also be noted from FIG. 1 that hydraulic cylinders 30 are longitudinally aligned with the diametral backing member in cross tube 52, and cylinder 27 is aligned similarly with the diametral backing member in cross tube 54. Accordingly, forces exerted on the cross tube members by the hydraulic cylinder connected thereto at pivot bores 68 will be directed through the centers of the cross tubes, and no unnecessary bending moments will be imparted to the cross tube or boom rails of the shovel linkage. In addition the force exerted on the cross tube by the hydraulic cylinder attached at pivot bore 68 will be directed along diametral backing member 76, resulting in greater strength in the cross tube and better distribution of the forces exerted by the hydraulic cylinder on the cross tube.

However, as boom 22 is pivoted on the excavator frame by hydraulic cylinders 26, master cylinder 27 must pivot in a vertical plane with respect to the boom rails and cross tube 54 at the cylinder end attached to the cross tube tab 66. Also, when stick cylinders 30 are actuated to pivot the stick on the boom, they must pivot vertically with respect to the boom and cam tube 52 of tab 66. If the axis of pivot bore 68 in tab 66 were horizontal to allow vertical pivoting of the cylinders thereabout, assembly and disassembly of the boom would be hampered since rails 44 would interfere with insertion and removal of the pivot pin.

Therefore pivot bore 68 is disposed in a generally vertical direction so a pivot pin may be inserted and removed without interference with the boom rails.

To allow for limited pivoting of cylinders 27 and 30 in a vertical plane they are connected to tabs 66 by means of ball joints shown generally at 80 in FIG. 6.

Ball joint 80 includes a ball 82 disposed in bore 68 and having flattened faces 84 and 86 in abutting engagement with matching faces 88 and 90 provided on portions 96 and 98 provided by a bifurcated end 102 of cylinders 30 and 27.

Ball 82 is provided with a pin bore 104 which is aligned with similar pin bores 106 and 108 provided in bifurcated portions 96 and 98. A pin 110 is disposed in pin bores 104, 106 and 108 to complete the ball joint.

The ball joints allow for the limited vertical rotation of the cylinder that is required during the working cycle of the excavator linkage. They also allow for any lateral rotation of the cylinder necessary to relieve any side-loading of the cylinders that might occur from different lateral dimension of the respective cylinder ends, or side deflection of the linkage as it is swung by the rotation of the frame on the undercarriage.

Since the pin bore is outwardly aligned it can be machined in the assembly, and the pin inserted and removed without interference.

The embodiments of the invention in which an exclusive property or privilege is claimed are defined as follows:

1. In a shovel linkage for a hydraulic excavator or the like including a boom comprising spaced parallel rails and cross tubes interconnecting said rails, and a stick pivotally connected to the boom and comprising spaced parallel rails and cross tubes interconnecting said rails, and hydraulic cylinder means connected to said stick and to said boom for pivoting of the stick with respect to the boom, means for mounting said cylinder means to one of said boom and said stick for limited pivoting with respect thereto comprising,
    tab means attached to a cross tube of said one of said boom and said stick and having pivot bore means provided therein, the axes of said pivot bores being skew with said rails of one of said boom and said stick,
    ball means disposed in said bore means and having pin bores provided therein,
    bifurcated end means provided on said hydraulic cylinder means including portions embracing said tab means and ball means, and having pin bores provided in said portions in axial alignment with the pin bore in said ball means, and
    a pin disposed in said pin bores provided in said ball means and bifurcated end portions,
    whereby said hydraulic cylinder means may pivot with respect to the tab means and boom around the center of the ball means, and
    wherein the tab means is substantially coplanar with a diameter of the cross tube and in line with a backing member forming an integral part of said cross tube along a diameter thereof, for strengthening said cross tube, and wherein the pivot bore axes are substantially normal to said tab means.

2. A linkage comprising a first link, and a second link pivotally connected to said first link, said first and second links comprising spaced parallel rails and cross tubes connecting said rails, hydraulic cylinder means for pivoting the second link with respect to the first link, flat tab means disposed on a cross tube of said first link and having a pivot bore provided therein, a ball disposed in said pivot bore and having flat faces provided thereon at the ends of said bore, a bifurcated end provided on said hydraulic cylinder and including end portions embracing the tab means and ball and having flat faces provided thereon arranged to abut the faces on the ball, coaxial pin bore means provided in the end portion of the bifurcated hydraulic cylinder end and in the ball, and a pin disposed in the ball and in the bifurcated end of the hydraulic cylinder embracing the ball, whereby said hydraulic cylinder can pivot with respect to the first link about the center of the ball as the second link pivots with respect to the first link and the axis of the pin does not intersect the link rails, and wherein the tab means is substantially coplanar with a diameter of the cross tube of the first link and in line with a backing member forming an integral part of said cross tube along a diameter thereof for strengthening said cross tube.

* * * * *